United States Patent
Phinney

[19]

[11] Patent Number: 6,013,209
[45] Date of Patent: *Jan. 11, 2000

[54] GRANULATION METHOD

[75] Inventor: Robin Phinney, Saskatoon, Canada

[73] Assignee: Airborne Industrial Minerals Inc., Calgery, Canada

[*] Notice: This patent is subject to a terminal disclaimer.

[21] Appl. No.: 08/966,530

[22] Filed: Nov. 10, 1997

Related U.S. Application Data

[63] Continuation of application No. 08/636,751, Apr. 19, 1996.

[51] Int. Cl.⁷ .......................................................... B29B 9/08
[52] U.S. Cl. ...................... 264/37.29; 264/113; 264/117; 264/122; 23/313 P
[58] Field of Search ..................................... 264/109, 112, 264/113, 117, 122, 37.1, 37.29; 425/222; 23/313 P

[56] References Cited

U.S. PATENT DOCUMENTS

| | | |
|---|---|---|
| 3,206,528 | 9/1965 | Coombs et al. . |
| 3,536,475 | 10/1970 | Trub ........................................ 264/117 |
| 3,635,691 | 1/1972 | Earl . |
| 3,711,254 | 1/1973 | McGowan et al. . |
| 3,785,796 | 1/1974 | Mann, Jr. . |
| 3,853,490 | 12/1974 | Boeglin et al. . |
| 4,131,668 | 12/1978 | Sasaki et al. . |
| 4,142,885 | 3/1979 | Heumann et al. . |
| 4,183,738 | 1/1980 | Carmon . |
| 4,264,543 | 4/1981 | Valenta . |
| 4,323,386 | 4/1982 | Heggebo et al. . |
| 4,330,319 | 5/1982 | Bexton et al. . |
| 4,334,906 | 6/1982 | Young . |
| 4,344,747 | 8/1982 | Henry . |
| 4,371,481 | 2/1983 | Pollock ..................................... 264/112 |
| 4,589,904 | 5/1986 | Harrison et al. . |
| 4,943,308 | 7/1990 | Vanmarcke et al. . |
| 5,108,481 | 4/1992 | Shutt . |
| 5,112,379 | 5/1992 | Young . |
| 5,124,104 | 6/1992 | Holley ..................................... 264/117 |
| 5,152,821 | 10/1992 | Walter . |
| 5,378,259 | 1/1995 | Bassetti et al. . |
| 5,383,951 | 1/1995 | Cross et al. . |
| 5,460,765 | 10/1995 | Derdall et al. ........................... 264/117 |
| 5,571,303 | 11/1996 | Bexton . |

FOREIGN PATENT DOCUMENTS 2214145   9/1996   Canada .

*Primary Examiner*—Jan H. Silbaugh
*Assistant Examiner*—Kenneth M. Jones
*Attorney, Agent, or Firm*—Paul Sharpe; Marks & Clerk

[57] ABSTRACT

An apparatus and method for uniform granulation is disclosed. The method involves the use of an initial feedstock having particle size of −150 mesh and 90% or greater particle size of 200 mesh. The feedstock may be contacted in a pan granulator which includes a minor amount of nucleating material of about −35 mesh. Binder is introduced into the pan granulator to progressively layer the feedstock material onto the nucleating to form a final product having a size distribution −8 mesh to +4 mesh. The method is designed to be interruptible and is particularly useful for forming granules having a plurality of layers of differing material. The method has marked improvement over the prior art methods since a particularly fine granule can be formed in a relatively expedient process to result in a granule having high commercial value and high break strength. These factors are achievable in addition to 100% product usage with no waste.

18 Claims, 1 Drawing Sheet

GRANULATION METHOD

This application is a continuation Ser. No. 08/636,751, filed Apr. 9, 1996.

FIELD OF THE INVENTION

The present invention is directed to a pan granulation method for forming granules and apparatus for effecting the method and more particularly, the present invention is directed to an improved selective size granulation method and apparatus for effecting the method.

BACKGROUND OF THE INVENTION

Generally speaking, pan granulation has been proposed in the art many times previously and with significant variations.

One of the latest issued patents in the art to which the present invention relates is U.S. Pat. No. 5,460,765, issued to Derdall et al., Oct. 24, 1995. The reference teaches a process for pan granulating a particulate material. Based on the teachings of the Derdall et al. reference, a final particle size distribution that is achievable by practicing the invention is between about −5 mesh to about +10 mesh. In order to initiate the process, the Derdall et al. process is limited to the introduction of a seeding material typically between about −14 mesh and +28 mesh. This is required in order to control the granule growth and as indicated in the Derdall et al. disclosure, seed minimizes mutual agglomeration and results in high yields being obtained. The Derdall et al. reference further indicates that the proper sizing of the seed is fundamental to the operation of the process for granulation in order to have product yields exceed 90%. Reference is made in the disclosure that a seed core in the range of −14 mesh to +35 mesh is required in order to achieve a steady state and maintain uniform size distribution of between −8 mesh to +6 mesh.

It would be desirable if a process were possible to achieve a high yield granular product within specified mesh sizes which does not require the use of a seed in the process.

The present invention is directed to satisfying the limitations in the art and more particularly those limitations in the Derdall et al. reference.

SUMMARY OF THE INVENTION

One object of the present invention is to provide an improved granulation method and an apparatus for effecting the improved granulation method.

A further object of the present invention is to provide a method of uniform granulation, comprising the steps of:

providing an initial feedstock having about 99.9% particle size of −150 mesh and about 90% or smaller particle size −200 mesh;

contacting the feedstock in a pan granulator containing a minor amount of a nucleating material of about −35 mesh; and introducing a binder material into the pan granulator to progressively layer feedstock material on the nucleating material to form a product having a size distribution of −8 to +4 mesh.

Advantageously, it has been found that the granulation process can be achieved in the absence of any seed material to result in a high yield product with high break strength.

Overall, the method relates to a procedure to granulate feedstocks that are in the −35 mesh size range and have no readily sized seed particles in the +35 mesh size fraction. A two-stage method is taught where an intermediate sized granule can be produced that is predominantly −8 mesh to +20 mesh in a first stage. This product can then be dried and screened such that the −8 to +20 portion of granules is used as a feed to the second stage.

In the second stage, the −8 to +20 mesh portion may be added to a second stage granulator pan where suitable binder is added to grow the small balls into uniform sized +8 to −4 mesh granules or balls which are then dried in the dryer.

The so-dried product may be then screened on −8 to +4 mesh to produce a new product in the form of a premium granular fertilizer, for example, break strength of greater than 1.0 kilograms (kg) with 3 to 4 kilograms (kg) being typical. The −8 to +20 mesh portion leaving the dryer may be recovered and recycled to the second stage pan. The +4 mesh and the −20 mesh portions may be sent to a suitable pulverizer for recycling.

Conveniently, the present method is particularly efficient. It has been found that no waste results in view of the fact that depending on the nature of the exiting product i.e. whether the same is to be recycled, is to be a final product stream or an intermediate stream, all particles are acted upon in the method in order to achieve the desired product thereby obviating waste.

As a particularly convenient feature of the method, no seed material is required in order to effect the procedure. It has been found that the nucleation center in the size range of −35 mesh to +150 mesh may be employed as a basis for granule growth and further, that the nucleation center may comprise any suitable material known to those skilled in the art. This has dramatic consequences in terms of cost savings as well as providing the user with the capacity to "shell" or "onion-skin" nucleation center with additional materials which may be similar or different from one another. This degree of freedom is obviously favourable, since multicomponent homogenous granules can be readily produced. As an example, and without being limiting, the process is applicable to granule formation where the granule includes a base fertilizer material which may be surrounded by a coating having limited solubility in order that the fertilizer be a time release type compound. As a further example, the process is particularly well suited to the formation of novel water softener balls or granules for use in water softening systems. Additionally, specialty fertilizer grades may be easily formed using the process according to the present invention. Utility for the process can be realized for a plethora of particle types.

As a further option, the process has applicability in other fields such as the preparation of ice melt product. As an example, for the formation of the sodium chloride granules, the process, according to one embodiment of the invention, permits the addition of Mg or $CaCl_2$ to the sodium chloride to enhance the ice melt characteristics and make a more efficient ice melt product. It will be appreciated by those skilled in the art that a host of additional examples may be achievable depending on the particular end use of the product.

According to a further object of the present invention, there is provided a method of granulating feedstock to produce a product in the −8 mesh to +20 mesh size distribution, comprising the steps of:

'providing an initial feedstock having about 99.9% particle size of −150 mesh and about 90% or smaller −200 mesh;

contacting, in a first stage, the feedstock in a first pan granulator containing a minor amount of a nucleating material of about −35 mesh;

introducing a binder material into the first pan granulator to produce an intermediate product that is sized between −8 mesh to +20 mesh;

drying the intermediate product; screening the intermediate product to produce a finished product, a recycled product and a second stage product;

contacting, in a second stage, the second stage product in a second pan granulator; and reintroducing the binder material into the second pan granulator to progressively layer sufficient feedstock material on the second stage product to thereby convert the second stage product to the finished product having a size distribution of −8 mesh to +4 mesh.

A still further object of the present invention is to provide an apparatus for generating a granule in a size distribution of +8 mesh to −4 mesh, comprising: pulverizing means for pulverizing feedstock in a size distribution of 99.9% of −150 mesh to 90% of −200 mesh; at least one pan granulator for receiving the feedstock; at least one receptacle for storing and dispensing nucleating material in the size range of −35 mesh to at least one pan granulator; binder storage and dispensing means for introducing binder; and dryer means for drying formed granules.

In accordance with the further desirable features of the present invention, the provision of a plurality of pan granulators permits full control and customization of the granule characteristics. By using one or a plurality of pan granulators when the process steps are observed, the result is that the granule can be uniformly grown under stabilized conditions without continual cycling as is the limitation in the prior art where only a single pan is disclosed for use. By employing the process parameters and apparatus according to the present invention, progressive accretion of the material on the granule is possible to result in a high density packed pellet with extremely high strength and a user predetermined size.

Significant additional advantages can be realized by the technology set forth herein including:

i) an enhanced market value of the formed product;

ii) the formation of a more user friendly product;

iii) significantly improved product handleability;

iv) a significantly improved uniformity index; and v) no product loss or waste.

The process and apparatus contribute to achieve a greater than 90% recovery of product which is on specification (spec) in the size range of +8 mesh to −4 mesh. Of the remaining 10% of the product, the same may be simply reintroduced into the pulverizer to create fines for reintroduction into the system. Accordingly, it will be readily apparent to those skilled that the process may be not only particularly useful for the user but further, results in monetary and energy savings from 100% use of the product.

In view of the elegance of the technology set forth herein, the result is that the apparatus and method may be applied in a retrofit application to existing systems which cannot achieve the level of efficiency attributed to the present technology set forth in the present case; existing systems may be significantly improved by simply adding the apparatus of the present invention and the method disclosed herein to improve such systems. This is a further advantage of the present invention in that the method is interruptible and does not require any specific parameters in terms of temperature, etc. in order to operate efficiently. In this manner, the pan granulators, employed in the present invention, may be arranged in any number of ways i.e. in series, parallel, towered etc., and may include any number of compounds to apply any number of layers on a granule as the same is grown through the system.

Having thus described the invention, reference will now be made to the accompanying drawing illustrating preferred embodiments.

BRIEF DESCRIPTION OF THE DRAWING

Similar numerals in the drawing denote similar elements.

DETAILED DESCRIPTION OF THE PREFERRED EMBODIMENTS

Figure 1:
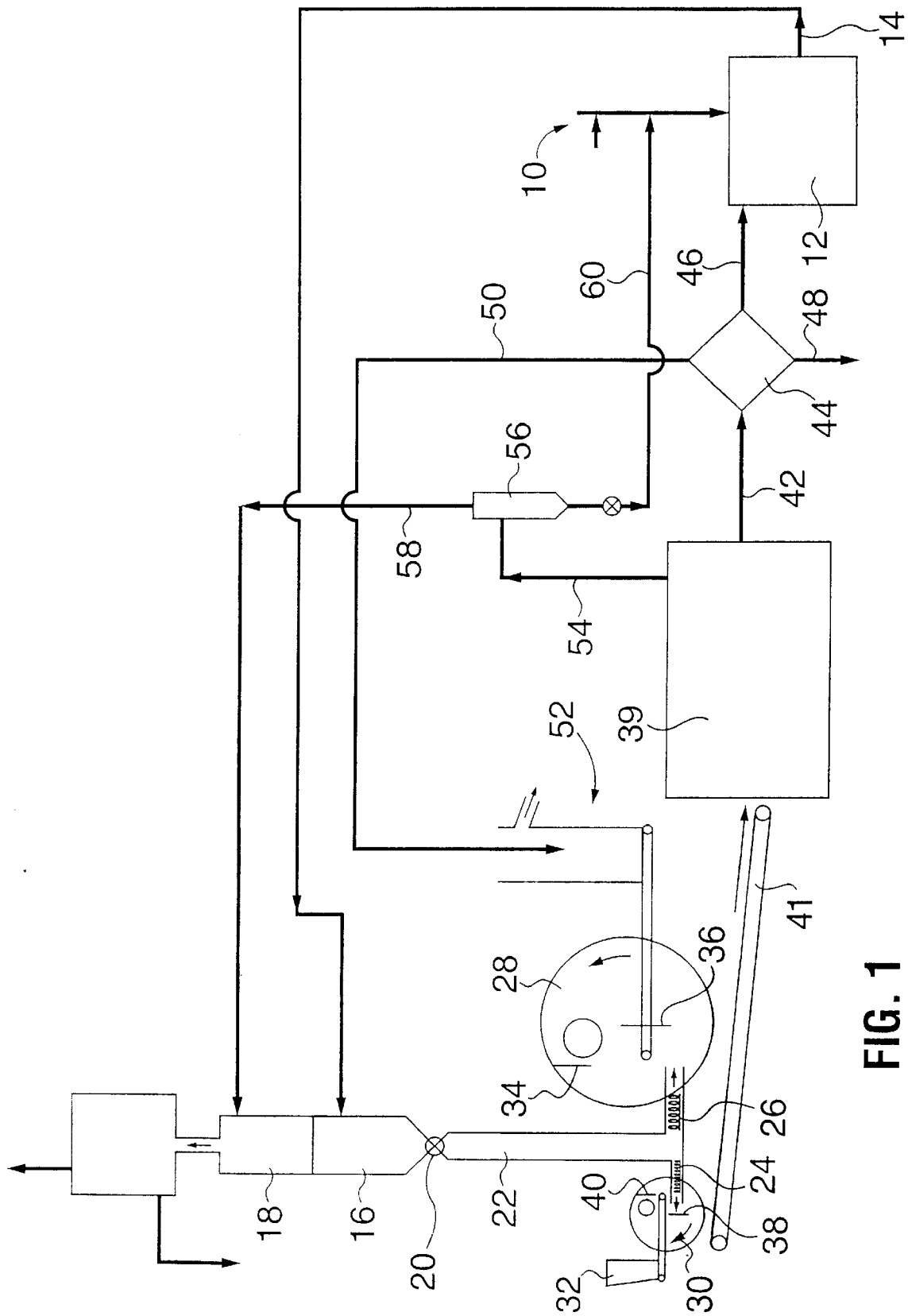
FIG. 1 illustrates a schematic representation of the method according to one embodiment of the present invention.

Referring now to FIG. 1, shown is an overall schematic representation of the process according to one embodiment.

In the embodiment shown, the circuit is representative of a ten ton per hour circuit. Reference numeral 10 denotes the introduction of feedstock which may be any suitable material. The technology set forth herein permits the formation of most any granulated product including various sulfates, soda ash, sulfur, potash, kaolin, magnesia, potassium sodium and ammonium chloride inter alia.

The feed may be introduced at 9.8 tons per hour (9.8 thr$^-$) along with suitable binder material as set forth herein previously. The feedstock and binder may be then introduced into a pulverizer 12 to pulverize the feedstock such that a product is produced having 99.9% −150 mesh and at least 90% −200 mesh. The pulverizer 12 may be a classifying pulverizer or air sweep pulverizer or any other suitable pulverizer known by those skilled in the art. Once pulverized, the stream, generally represented by numeral 14, is introduced into a sealed collection hopper, globally denoted by numeral 16, which includes a bag house 18 to collect dust. Collection hopper 16 includes suitable valve 20 for metering dust into a collection bin 22. The bin 22 is mounted over two feeders 24 and 26 which divide the material being received from bin 22 into two streams, the first stream being fed by feeder 26 to a first large pan granulator 28 at a rate of 7.6 tons per hour (7.6 thr$^{-1}$), as an example, while feeder 24 feeds a second stream into a second pan granulator 30, being smaller than pan granulator 28. The feed rate to the small pan may be 2.8 tons per hour (2.8 thr$^{-1}$), as an example, to be consistent with the ten ton per hour circuitry.

Pan 30 is equipped with a small receptacle 32 for retaining −35 mesh dry raw feedstock (not shown). The receptacle 32 is equipped with a variable rate metering apparatus (not shown). The feeder removes the material from the receptacle 32 and introduces the dry raw feedstock into pan 30. As is known in the art, the pan granulators 28 and 30 include upper and lower scrapers 34, 36 and 38, 40, respectively. Regarding the feedstock from receptacle 32, the same is introduced to the pan 30 behind top scraper 38. In this example, the production rate for the pan 30 would be set for 3 tons per hour (3 thr$^{-1}$) with a size distribution of approximately 80% product between −8 mesh to +20 mesh. It has been found that this is achievable by combining the raw feedstock to the dust at a ratio of 1:20 to 1:100 parts. The use of an atomizing hot binder solution at any position from the 12 o'clock through to the 5 o'clock position has been found to be particularly useful. When the correct free moisture is attained, generally between 10 to 10.5%, the first pan stabilizes at a steady state condition.

As indicated above, the product formed from pan 30 is typically between 50 to 80% −8 mesh. The product is discharged and dried with dryer 39. Dryer 39 may be selected from, for example, Carrier dryers, tray dryers or roto louver type dryers. The product being formed in large pan 28 is additionally transported to dryer 39 via a suitable conveyer, globally denoted by numeral 41.

Product exiting dryer 39 via stream 42 is then screened by a suitable screening arrangement 44 at 4 mesh, 8 mesh and 20 mesh. The +4 and −20 mesh portions are sent to pulverizer 12 for recycling into the system, the recycling stream being indicated by numeral 46. The −4 to +8 mesh portion is the final product and leaves screen 44, as indicated by numeral 48, as a final finished product. The −8 to +20 mesh portion is sent via stream 50 to a hopper equipped with a weigh belt feeder, broadly denoted by numeral 52. The material is advanced from the weigh belt feeder 52 into pan 28 whereupon the product is further processed by the introduction of binder and additional dust to produce a desired granule product.

Any residual dust which may be present in dryer 39 may be passed via line 54 for exiting dryer 39 to hopper 56 and the collected material in hopper 56 either passed onto the bag house 18 via line 58 or passed into the feedstock via line 60. The fines or dust entering bag house 18 may additionally be passed off onto ancillary operations, for example, wet scrubbing, as broadly denoted by numeral 60 in FIG. 1. Other examples will be readily apparent to those skilled in the art.

The ratio of −8 to +20 mesh product needed to run pan 28 at a steady state has been found to be, for the system described herein, between 1:10 to 2:5, an optimum of 1:5. Pan 28 stabilizes quickly and produces yields of greater than 95% on +8 to −4 mesh. The process yield from the overall circuit as set forth herein exceeds 90%. As discussed briefly herein previously, 10% of the weight, which is in the −20 and +4 mesh size distribution, as well as dryer dusts, can be recycled to enhance the efficiency and productivity of the method to produce maximum yields at very low cost.

With further reference to the pans 28 and 30, as is known, the pans may be adjusted for angle and rotational speed such that the +8 to −4 mesh granules are the only product produced. In addition, it has been found advantageous to not only change the horizontal disposition of the pans, but also to laterally tilt the pans to enhance the efficiency of the granulating process. The specific angle of tilt and horizontal angle will be dependent upon the rotational speed and the size of the granule desired to be produced.

It will be appreciated that the method for operation as discussed can be a single operation or may be incorporated into a unit operation within a series of other operations. This will depend upon the specific needs of the user.

It will also be readily appreciated that any number of pans can be incorporated into the system to progressively grow or accrete a granule. To this end, the process is interruptible and therefore can be custom designed to produce granules having a variety of layers of material to produce a host of valuable granules. It will be clear to those skilled in the art that the process is effective for producing a number of different forms of fertilizer and has particular utility with respect to the formation of high grade fertilizer for use on golf courses, etc.

In terms of the binder, suitable example include lignosol, sugars, saturated salts and proteins, water, calcium sulfate, sodium sulfate, potassium chloride, dry gluttens, wheat grains, barley grains, rice grains and calcium phosphate among others. The choice of the binder will depend on the desired characteristics of the granule and accordingly, the aforementioned examples are only exemplary.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of uniform granulation, comprising the steps of:

providing an initial feedstock having a uniform size distribution of about 99.9% particle size of −150 mesh of said 99.9% particle size of −150 mesh about 90% comprising a particle size of −200 mesh;

providing a nucleating material, granulating said feedstock in a plurality of phases, said phases including a nucleating phase including contacting nucleating material in a size distribution of about −35 mesh and +150 mesh with said feedstock to form a particle;

introducing a binder material in the presence of moisture onto a first pan granulator to progressively layer feedstock material on said nucleating material;

a second seeding phase including layering feedstock onto said particle from said first phase to form a first intermediate product or seeding agent having a size distribution of −8 mesh to +20 mesh;

drying said seeding agent; and a third granulation phase including selectively introducing said seeding agent into a second pan graduator for further layering of feedstock to form a second product having a uniform size distribution of −8 mesh to +4 mesh.

2. The method as defined in claim 1, wherein said second phase comprises a different material from said initial feedstock for uniform layering on said product.

3. The method as defined in claim 1, wherein said nucleating material comprises feedstock.

4. The method as defined in claim 1, wherein said nucleating material comprises material other than said feedstock.

5. The method as defined in claim 1, wherein said nucleating material comprises about 1% by weight of said feedstock.

6. The method as defined in claim 1, wherein said binder is present in an amount from about 1% to about 5% by weight of said feedstock.

7. The method as defined in claim 6, wherein said binder is present in an amount of 2% by weight of said feedstock.

8. The method as defined in claim 1, wherein said second product includes size distribution of product between −8 mesh to +20 mesh.

9. The method as defined in claim 8, further including the step of screening said product at 4, 8 and 20 mesh.

10. The method as defined in claim 9, further including a step of separating product sizes.

11. The method as defined in claim 10, further including the step of reintroducing +4 mesh and −20 mesh products into a pulverizer for conversion to a recycle product.

12. The method as defined in claim 11, further including the step of introducing −8 mesh and +20 mesh product into a further pan granulator.

13. The method as defined in claim 11, wherein said binder is atomized and sprayed on said pan granulator.

14. The method as defined in claim 13, wherein said binder is added to said initial feedstock.

15. The method as defined in claim 14, wherein said binder includes lignosol, sugars, saturated salts and proteins, water, calcium sulfate, sodium sulfate, potassium chloride, dry gluttens, wheat grains, barley grains, rice grains and calcium phosphate.

16. The method as defined in claim 13, wherein said intermediate product contains from about 50% to about 80% −8 mesh material.

17. The method as defined in claim 1, wherein said second stage product contains −8 mesh to +20 mesh product.

18. A method of granulating feedstock to produce a product in the −8 mesh to +20 mesh size distribution, comprising the steps of:

providing a nucleating material;

providing an initial feedstock having a uniform size distribution of about 99.9% particle size of −150 mesh of said 99.9% particle size of −150 mesh about 90% comprising a particle size of −200 mesh;

granulating in a plurality of phases, said phases including:

a nucleating phase including contacting said nucleating material in a size distribution of about −35 mesh and +150 mesh with said feedstock;

introducing a binder material in the presence of moisture onto a first pan graduator to progressively layer feedstock material on said nucleating material;

a second seeding phase including layering feedstock onto said particle from said first phase to form a seeding agent having a size distribution of −8 mesh to +20 mesh;

drying said seeding agent;

screening said seeding agent to produce a finished product, a recycled product and a second stage product;

contacting said seeding agent in a second pan granulator; and reintroducing said binder material into said second pan granulator to progressively layer sufficient feedstock material onto said seeding agent to convert said seeding agent to said finished product having a size distribution of −8 mesh to +4 mesh.

* * * * *